US006434877B1

(12) United States Patent
Shelton

(10) Patent No.: US 6,434,877 B1
(45) Date of Patent: Aug. 20, 2002

(54) COLLAPSIBLE HUNTER'S BLIND

(76) Inventor: Dennis Shelton, 1305 Lake Point Dr. S., Lakeland, FL (US) 33813

( * ) Notice: Subject to any disclaimer, the term of this patent is extended or adjusted under 35 U.S.C. 154(b) by 0 days.

(21) Appl. No.: 09/199,064

(22) Filed: Nov. 24, 1998

(51) Int. Cl.[7] .............................................. A01M 31/00
(52) U.S. Cl. ................................ 43/1; 135/90; 135/96; 135/901; 160/80; 160/127; 160/330
(58) Field of Search ........................... 43/1; 135/90, 96, 135/901; 160/64, 80, 127, 330, 351, 368.2

(56) References Cited

U.S. PATENT DOCUMENTS

| | | | | |
|---|---|---|---|---|
| 1,376,218 A | * | 4/1921 | Morant | |
| 2,770,244 A | * | 11/1956 | Carson | |
| 3,116,808 A | * | 1/1964 | Riley | |
| 4,739,785 A | * | 4/1988 | Poulson | 135/117 |
| 4,805,655 A | * | 2/1989 | Justice | 135/90 |
| 5,613,512 A | * | 3/1997 | Bean | 135/90 |

* cited by examiner

Primary Examiner—Robert Canfield
(74) Attorney, Agent, or Firm—Bode & Associate; George A. Bode; Lisa D. Charouel

(57) ABSTRACT

A collapsible hunter's blind apparatus, for enclosing a hunter in a truncated triangularly-shaped enclosure, comprising: first and second vertically draping camouflage panels, a first horizontal telescopic frame member for horizontally supporting the first vertically draping camouflage panel, and a second horizontal telescopic frame member for horizontally supporting the second vertically draping camouflage panel. The first and second horizontal telescopic frame members are coupled to the sides of a tree trunk via an adjustable strap member. The collapsible hunter's blind apparatus further comprises an arc-shaped strap member which provides a reciprocating force to counterbalance gravitational forces and the weight of the horizontally supported first and second vertically draping camouflage panels acting on the first and second telescopic horizontal support members, respectively, to maintain each of the first and second telescopic horizontal support members substantially horizontal.

20 Claims, 6 Drawing Sheets

COLLAPSIBLE HUNTER'S BLIND

BACKGROUND OF THE INVENTION

1. Field of the Invention

The present invention relates to a portable hunter's blind apparatus and, more particularly, to a collapsible hunter's blind apparatus comprising two telescopic horizontal support members pivotally coupled to the sides of a tree via a first strap means wherein the two telescopic horizontal support members radially flare, pivotally, from the sides of the tree at an adjustable angle and a second strap means which serves to 1) provide a reciprocating force to counterbalance gravitational forces and the weight of the horizontally supported vertically draping camouflage fabric acting on each of the two telescopic horizontal support members to maintain each of the two telescopic horizontal support members substantially horizontal without the use of vertical ground support members; and 2) adjust the angle between the two telescopic horizontal support members which radially flare, pivotally, from the sides of the tree to form an adjustable truncated triangularly-shaped enclosure for enclosing a hunter.

2. General Background

Typically, hunters wait quietly and patiently while sitting, squatting or standing on the ground or in a tree for their prey. However, such prey often has very keen senses such as, without limitation, sharp eyesight and hearing. Thereby, the slightest movement by the hunter can be detected by the prey causing the prey to run.

In order for the hunters to blend with the environment, hunters camouflage themselves with camouflaged clothing so that their bodies are undetected by their prey. However, camouflaged clothing oftentimes is insufficient because of the hunter's movements are not camouflaged. Therefore, in some instances, hunters further use hunter's blind apparatuses having camouflaged fabric to blind themselves and their movements while quietly and patiently waiting for their prey. Even while sitting in a tree on a tree stand, hunter's blind-type apparatuses have been used. Since, hunters often walk great distances into the woods and move from one tree to another, it is highly desirable that the hunter's blind apparatus is easily collapsible and portable, as well as, relatively simple structurally and mechanically. In other words, the hunter's blind apparatus should minimize the frame support structure used to support the camouflage fabric.

Several apparatuses have been patented which are aimed at hunter's shelters and blinds.

U.S. Pat. No. 5,613,512, by Bean, entitled "BLIND STRUCTURE FOR USE WITH TREE STAND" is directed to a tree stand seat having a blind enclosure supported therearound.

U.S. Pat. No. 5,414,950, by Johnson, Sr., entitled "PORTABLE, ADJUSTABLE BLIND" discloses a fixed frame and an adjustable frame telescoping into the fixed frame with camouflaged panels attached thereto. The adjustable frame allows the height of the blind to be adjusted. The fixed frame is supported by the ground.

U.S. Pat. No. 5,062,234, by Green, entitled "PORTABLE BLIND" discloses a plurality of telescopic supports having coupled thereto camouflage material. The telescopic supports are supported by the ground.

U.S. Pat. No. 4,951,696, by Jones Sr., entitled "HUNTING STAND" discloses a hunter's stand supported in a tree having a basket shape. The basket shape frame has coupled thereto camouflage fabric.

U.S. Pat. No. 4,805,655, by Justice, entitled "PORTABLE AWNING" discloses an awning apparatus which includes a triangular frame coupled to a tree trunk having a flexible cover coupled to such triangular frame.

U.S. Pat. No. 4,505,286, by Madion, entitled "PORTABLE SHELTER" discloses a flexible rod supported about the trunk of a tree in a bow-like manner. The cloth is coupled to the tree and to the flexible rod to form a semi-conical roof. Additionally, camouflage netting or canvas may be vertically draped from the hem of the cloth of the roof.

U.S. Pat. No. 3,913,598, by Gutting, Jr. et al., entitled "HUNTER'S BLIND AND SHELTER" discloses a hunter's blind having fabric walls attached to portable wall frame structures which are pivotally and removably attached to each other. As can be seen, the frame structure, by Gutting, Jr. et al. comprises a plurality of vertical, horizontal and V-shaped members. Such frame is essentially supported by the ground.

U.S. Pat. No. 3,690,334, by Miller, entitled "PORTABLE HUNTING BLIND" discloses an opaque plastic housing with transparent windows and a plurality of elongated members adapted to be detachably secured together to form a frame. As can be seen, the elongated members, by Miller, extend in the vertical plane wherein the ground provides support for the frame.

U.S. Pat. No. 5,408,782, by McConnell, entitled "TREE SKIRT" is directed to a seat made of camouflage material wherein the seat is coupled around the trunk of a tree.

SUMMARY OF THE PRESENT INVENTION

The preferred embodiment of the collapsible hunter's blind apparatus of the present invention solves the aforementioned problems in a straight forward and simple manner. What is provided is a collapsible hunter's blind apparatus comprising two telescopic horizontal support members pivotally coupled to the sides of a tree via a first strap means wherein the two telescopic horizontal support members radially flare, pivotally, from the sides of the tree at an angle and a second strap means which serves to 1) provide a reciprocating force to counterbalance gravitational forces and the weight of the horizontally supported vertically draping camouflage fabric acting on each of the two telescopic horizontal support members to maintain each of the two telescopic horizontal support members substantially horizontal without the use of vertical ground support members; and 2) adjust the angle between the two telescopic horizontal support members which radially flare, pivotally, from the sides of the tree to form an adjustable truncated triangularly-shaped enclosure for enclosing a hunter.

The collapsible hunter's blind apparatus of the present invention for enclosing a hunter comprises first and second vertically draping camouflage panels; a first horizontal telescopic frame member for horizontally supporting said first vertically draping camouflage panel; a second horizontal telescopic frame member for horizontally supporting said second vertically draping camouflage panel; an adjustable strapping member for coupling said first and second horizontal telescopic frame members in circumferential spaced relation around a tree trunk; and, arc-shaped strap means which serves to 1) provide a reciprocating force to counterbalance gravitational forces and the weight of the horizontally supported first and second vertically draping camouflage panels acting on said first and second telescopic horizontal support members, respectively, to maintain each of said first and second telescopic horizontal support members substantially horizontal.

In view of the above, it is an object of the present invention to provide a collapsible hunter's blind apparatus which comprises two telescopic horizontal support members wherein each telescopic horizontal support member has a fixed horizontal member and a telescoping horizontal member wherein the telescoping horizontal member serves to 1) allow the length of the telescopic horizontal frame support member to be significantly shortened when in the collapsed state; and 2) allows the length from which each telescopic horizontal frame support member radially projects from the tree trunk to be adjusted, as desired.

Another object of the invention is to provide a collapsible hunter's blind which essentially comprises two individual telescopic horizontal support members, a first strap means, a second strap means and two vertically draping camouflage panels.

A further object of the present invention is to provide a collapsible hunter's blind apparatus which can be supported around a variety of tree trunk circumferences via a first strap means.

It is a still further object of the present invention to provide a collapsible hunter's blind apparatus which can be coupled any height from the ground, as desired.

It is a still further object of the present invention to provide a collapsible hunter's blind apparatus which is accommodatable within an elongated carry bag made of camouflage material wherein the carry bag can be easily carried on the shoulder of the hunter.

It is a still further object of the present invention to provide a collapsible hunter's blind apparatus which forms an enclosure which has a truncated triangular shape wherein the length of the base of the triangle can be increased or decreased as desired by increasing or decreasing the distance between the radially flared ends of the two telescopic horizontal support members.

It is a further object of the present invention to provide such a collapsible hunter's blind apparatus which eliminates the need for vertical ground support of the two telescopic horizontal support members.

It is a further object of the present invention to provide such a collapsible hunter's blind apparatus which eliminates the need for crossing frame support members which maintain the two telescopic horizontal support members in spaced relation.

It is a further object of the present invention to provide such a collapsible hunter's blind apparatus having two telescopic horizontal support members, a first strap means circumferentially securable around a tree trunk for supporting such two telescopic horizontal support members at a desired height, and a second strap means for providing a counterbalancing force to maintain the two telescopic horizontal support members essentially in the horizontal plane regardless of gravitational forces acting thereon and the weight of camouflage fabric panels suspended therefrom.

It is a further object of the present invention to provide such a collapsible hunter's blind apparatus which may be used by wildlife observers such as photographers who watch the wildlife at very close ranges.

In view of the above objects, it is a feature of the present invention to provide a collapsible hunter's blind apparatus which is relatively simple structurally and mechanically.

Another feature of the present invention is to provide a collapsible hunter's blind apparatus which is lightweight and easily carried by the hunter into the woods.

It is another feature of the present invention to provide a collapsible hunter's blind apparatus which is easy and quick to assemble and disassemble.

It is another feature of the present invention to provide a collapsible hunter's blind apparatus which inexpensive and simple to manufacture.

The above objects and other features of the present invention will become apparent from the drawings, the description given herein, and the appended claims.

BRIEF DESCRIPTION OF THE DRAWING

For a further understanding of the nature and objects of the present invention, reference should be had to the following description taken in conjunction with the accompanying drawings in which like parts are given like reference numerals and, wherein.

DETAILED DESCRIPTION OF THE PREFERRED EMBODIMENT

Figure 2:
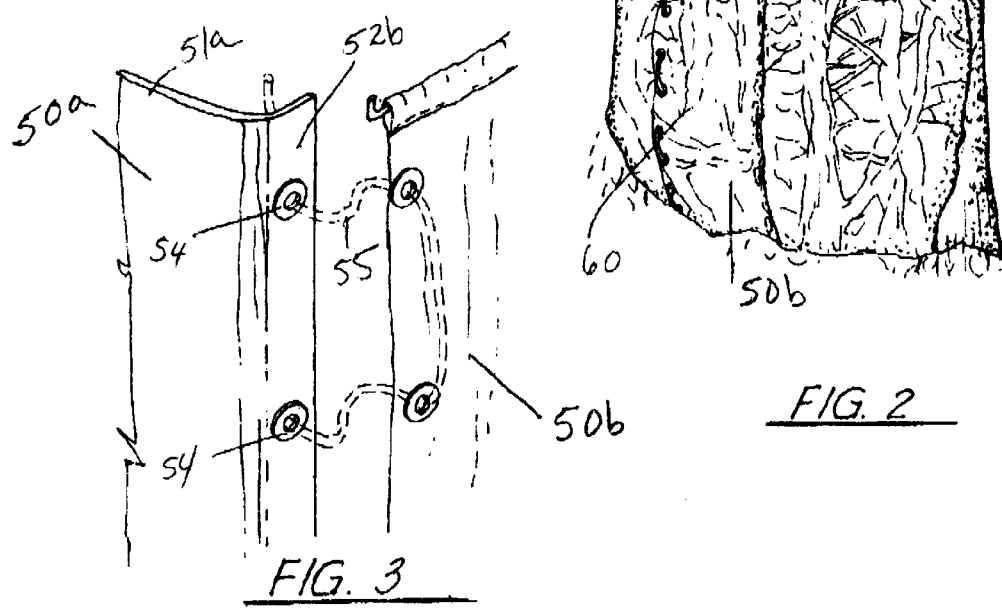
FIG. 2 illustrates a side perspective view of the collapsible hunter's blind apparatus of the present invention with a hunter enclosed within the truncated triangularly-shaped enclosure.
Figure 8:
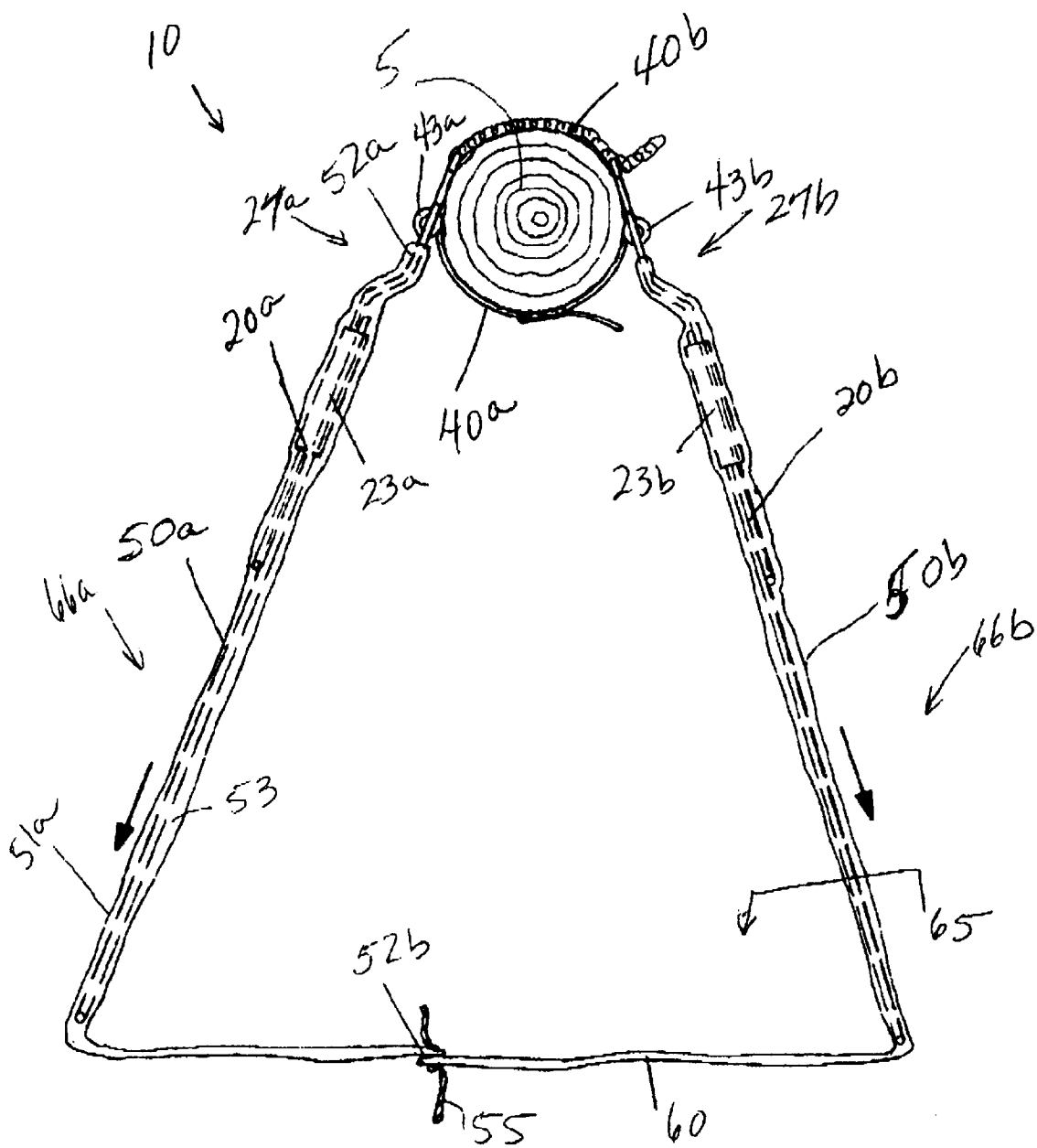
FIG. 8 illustrates a top view of the collapsible hunter's blind apparatus of the present invention forming the truncated triangularly-shaped enclosure; and, FIG. 9 illustrates an exploded view of the two telescopic horizontal support members, the first strap means and the second strap means of the collapsible hunter's blind apparatus of the present invention.

Referring now to the drawing, and in particular FIGS. 2 and 8, the collapsible hunter's blind apparatus of the present invention is designated generally by the numeral 10. Collapsible hunter's blind apparatus 10 serves to enclose hunter 3 in a truncated triangularly-shaped enclosure. There are numerous heights in which collapsible hunter's blind apparatus 10 may be secured to tree trunk 5. In the exemplary embodiment, collapsible hunter's blind apparatus 10 is secured around tree trunk 5 at a height which allows the head of hunter 3 to extend above collapsible hunter's blind apparatus 10. Collapsible hunter's blind apparatus 10 is generally comprised of first telescopic horizontal support member 20a, second telescopic horizontal support member 20b, first strap means 40a, second strap means 40b and first and second camouflage panels 50a and 50b.

First telescopic horizontal support member 20a comprises fixed horizontal member 21a, telescopic horizontal member 22a, telescopic support conduit 23a and securing structure 27a. Telescopic horizontal member 22a is parallelly aligned with fixed horizontal member 21a and both telescopic horizontal member 22a and fixed horizontal member 21a are maintained essentially parallelly aligned in telescopic support conduit 23a. Telescopic horizontal member 22a freely slides within telescopic support conduit 23a. In operation, as fixed horizontal member 21a is swung about trunk 5 of the tree, telescopic horizontal member 22a is always maintained essentially parallelly aligned with fixed horizontal member 21a via telescopic support conduit 23a.

Figure 4:
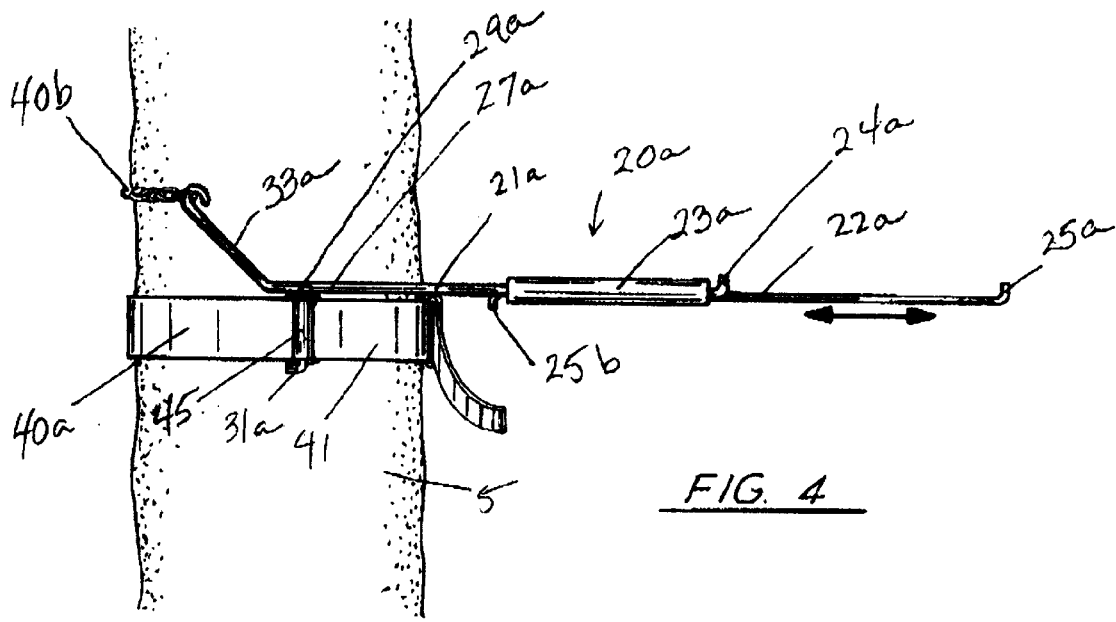
FIG. 4 illustrates a side perspective view of one of the two telescopic horizontal support members coupled to the tree trunk.

One end of fixed horizontal member 21a is curved upward to form stop flange member 24a. One end of telescopic horizontal member 22a is curved upward to form first stop flange member 25a and the other end of telescopic horizontal member 22a is curved downward to form second stop flange member 25b. First and second stop flange members 25a and 25b serve to prevent telescopic horizontal member 22a from sliding out of telescopic support conduit 23a even when telescopic horizontal member 22a is in its fully extended position, as best seen in FIG. 4. The length of stop flange member 24a of fixed horizontal member 21a and the length of first and second stop flange members 25a and 25b of telescopic horizontal member 22a should be sufficient to maintain fixed horizontal member 21a and telescopic horizontal member 22a within telescopic support conduit 23a without compromising the sliding movement of first camouflage panel 50a along the shaft defined by fixed horizontal member 21a and telescopic horizontal member 22a in its fully extended position.

Referring also to FIG. 4, as telescopic horizontal member 22 is telescoped into its fully extended position, stop flange member 24a abuts one end of telescopic support conduit 23a and second stop flange member 25b abuts the other end of telescopic support conduit 23a. When telescopic horizontal member 22a is in its collapsed position first stop flange member 25a and stop flange member 24a both abut against the same side of telescopic support conduit 23a.

Figure 7:
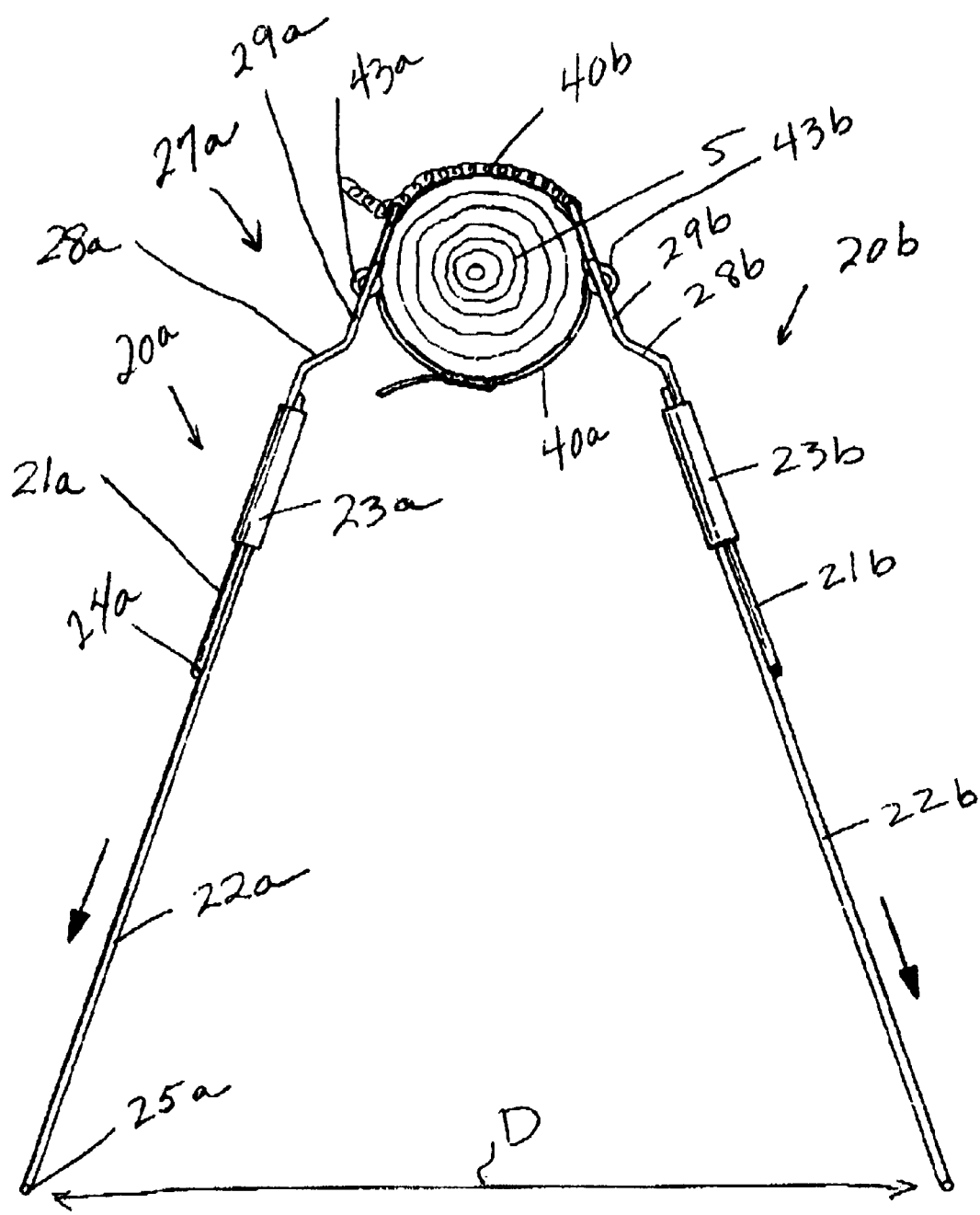
FIG. 7 illustrates a top view along the plane of 7—7 of FIG. 6 of the two telescopic horizontal support members radially flared from the trunk of a tree at an angle.
Figure 9:
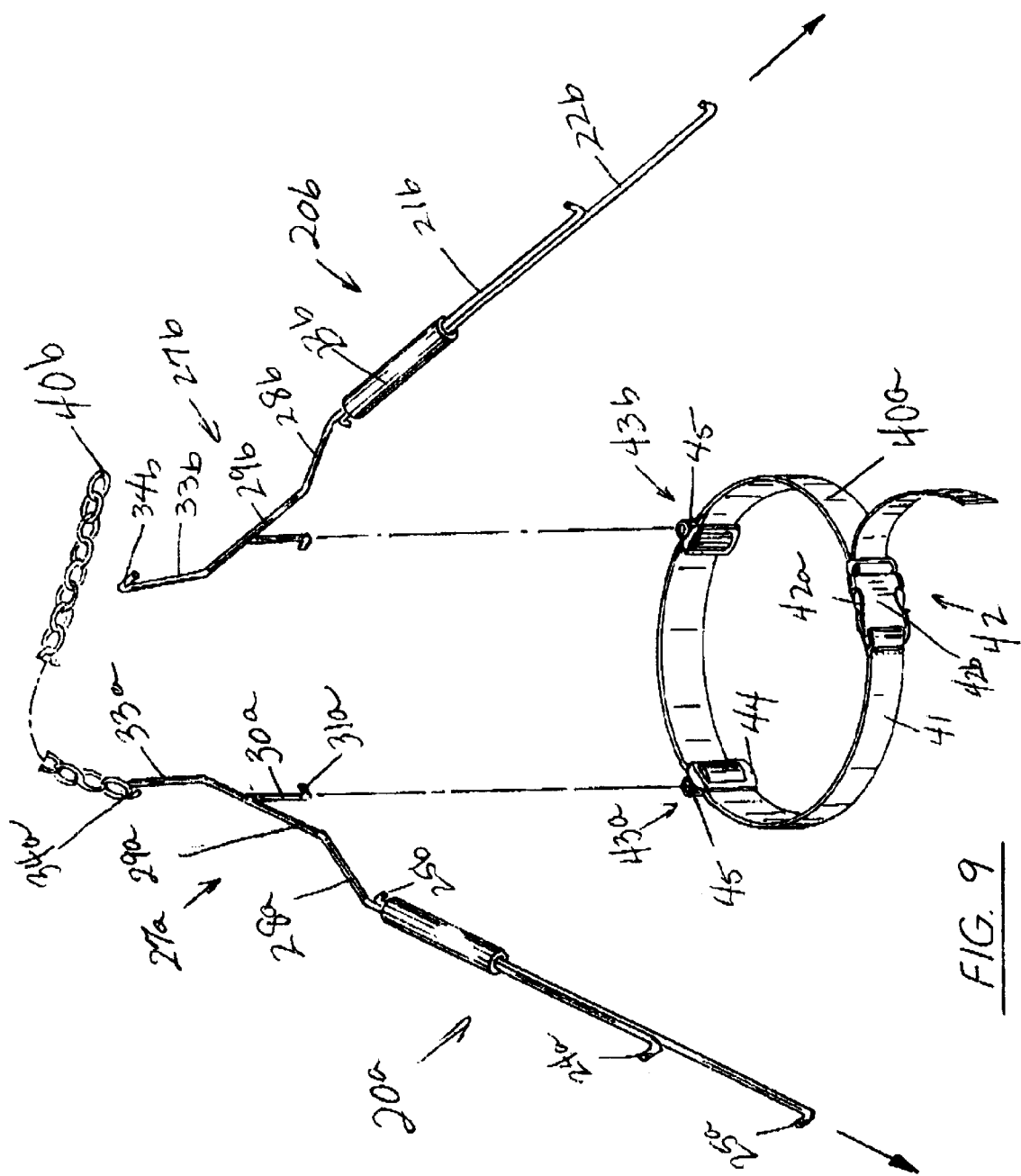

Referring also to FIGS. 7 and 9, the other end of fixed horizontal member 21a has coupled thereto securing structure 27a. Securing structure 27a comprises first angled member 28a, short horizontal member 29a, pivot rod member 30a and second angled member 33a. The unique profile of securing structure 27a serves to 1) allow fixed horizontal member 21a to be angled from the side of the trunk 5 of a tree; 2) allows fixed horizontal member 21a to be pivoted about such side for adjusting the angle between first telescopic horizontal support member 20a and second telescopic horizontal support member 20b; and, 3) provides a lifting means for transferring a counterbalancing force from second strap means 40b to fixed horizontal member 21a for maintaining fixed horizontal member 21a essentially parallel to the horizontal plane regardless of gravitational forces acting thereon and the weight of first camouflage panel 50a suspended therefrom.

The other end of fixed horizontal member 21a has coupled thereto one end of first angled member 28a of securing structure 27a wherein first angled member 28a is angled in the horizontal plane in the direction of tree trunk 5. First angled member 28a forms an obtuse angle with respect to fixed horizontal member 21a. The other end of first angled member 28a has coupled thereto short horizontal member 29a wherein short horizontal member 29a is parallel to fixed horizontal member 21a. In operation, short horizontal member 29a abuts against the side of tree trunk 5 thereby, the angle of first angled member 28a serves to angle fixed horizontal member 21a a distance from the side of tree trunk 5.

The other end of short horizontal member 29a has coupled thereto one distal end of second angled member 33a wherein second angled member 33a is angled upward in an inclined vertical direction. The other distal end of second angled member 33a is curved to form hook means 34a for coupling thereto second strap means 40b. In the preferred embodiment, second strap means 40b is a chain-linked strap wherein one link is secured in hook means 33a. As can be appreciated second angled member 33a provides a lifting means for transferring a counterbalancing force from second strap means 40b to fixed horizontal member 21a for maintaining fixed horizontal member 21a essentially parallel to the horizontal plane regardless of gravitational forces acting thereon and the weight of first camouflage panel 50a suspended therefrom.

Short horizontal member 29a has perpendicularly coupled thereto one end of pivot rod member 30a. Preferably, pivot rod member 30a is perpendicularly coupled to the center of short horizontal member 29a thereby as fixed horizontal member 21a is swung outward via pivot rod member 30a, short horizontal member 29a seesaws about the side of tree trunk 5. The other end of pivot rod member 30a is curved to form anchoring means 31a.

First telescopic horizontal support member 20a is secured to first strap means 40a via pivot rod member 30a. As can be appreciated, pivot rod member 30a allows fixed horizontal member 21a to be pivoted about the side of tree trunk 5 for adjusting the angle between first telescopic horizontal support member 20a and second telescopic horizontal support member 20b.

Second telescopic horizontal support member 22b comprises fixed horizontal member 21b, telescopic horizontal member 22b, telescopic support conduit 23b and securing structure 27b. Second telescopic horizontal support member 20b differs from first telescopic horizontal support member 20a in that first angle member 28b of securing structure 27b is angled in the horizontal plane in an equal but opposite direction than that of first angle member 28a to distance at an angle fixed horizontal support member 21b of second telescopic horizontal support member 20b from the other side of tree trunk 5.

Second telescopic horizontal support member 20b further differs from first telescopic horizontal support member 20a in that hook means 34b of second angled member 33b permits second strap means 40b to be easily detached from hook means 34b for adjusting the length of second strap means 4b.

In the preferred embodiment, first and second telescopic horizontal support members 20a and 20b are made of metal rods having a relatively small diameter. Nevertheless, first and second telescopic horizontal support members 20a and 20b may be made of a durable plastic material which is not easily bent under the weight of the horizontally supported vertically draping camouflage panels 50a and 50b. In the exemplary embodiment, fixed horizontal members 21a and 21b are substantially 20 inches long. Telescopic horizontal members 22a and 22b are substantially 31 inches long. First angled member 28a and 28b are substantially 4 inches long. Short horizontal members 29a and 29b are substantially 5 inches long. Second angled members 33a and 33b are substantially 3½ inches long. The length from one distal end of fixed horizontal member 21a to the other distal end of second angled member 33a is substantially 32 inches long.

Second strap means 40b forms an arc-shaped strap which conforms to the contour of tree trunk 5. Second strap means 40b is secured to second angle members 33a and 33b via hook members 34a and 34b, respectively. Second strap means 40b is strapped around the back of tree trunk 5 and serves to pull the lifting means defined by second angled member 33a and the lifting means defined by second angled member 33b in a backward direction to maintain first telescopic horizontal support member 20a and second telescopic horizontal support member 20b, respectively, essentially parallel in the horizontal plane. Furthermore, as the length of second strap means 40b is decreased, the distance D between the radially flared ends of first telescopic horizontal support member 20a and second telescopic horizontal support member 20b is increased. As can be readily seen, the tree supported arc-shaped second strap means 40b serves to 1) provide a reciprocating force to counterbalance gravitational forces and the weight of the horizontally supported vertically draping camouflage panels 50a and 50b acting on first and second telescopic horizontal support members 20a and 20b, respectively, to maintain each of first and second telescopic horizontal support members 20a and 20b substantially horizontal without the use of vertical ground support members; and 2) adjust the angle between first and second telescopic horizontal support members 20a and 20b which radially flare, pivotally, from the sides of tree trunk 5 to form an adjustable truncated triangularly-shaped enclosure 65, as best seen in FIG. 8, for enclosing hunter 3.

Figure 6:
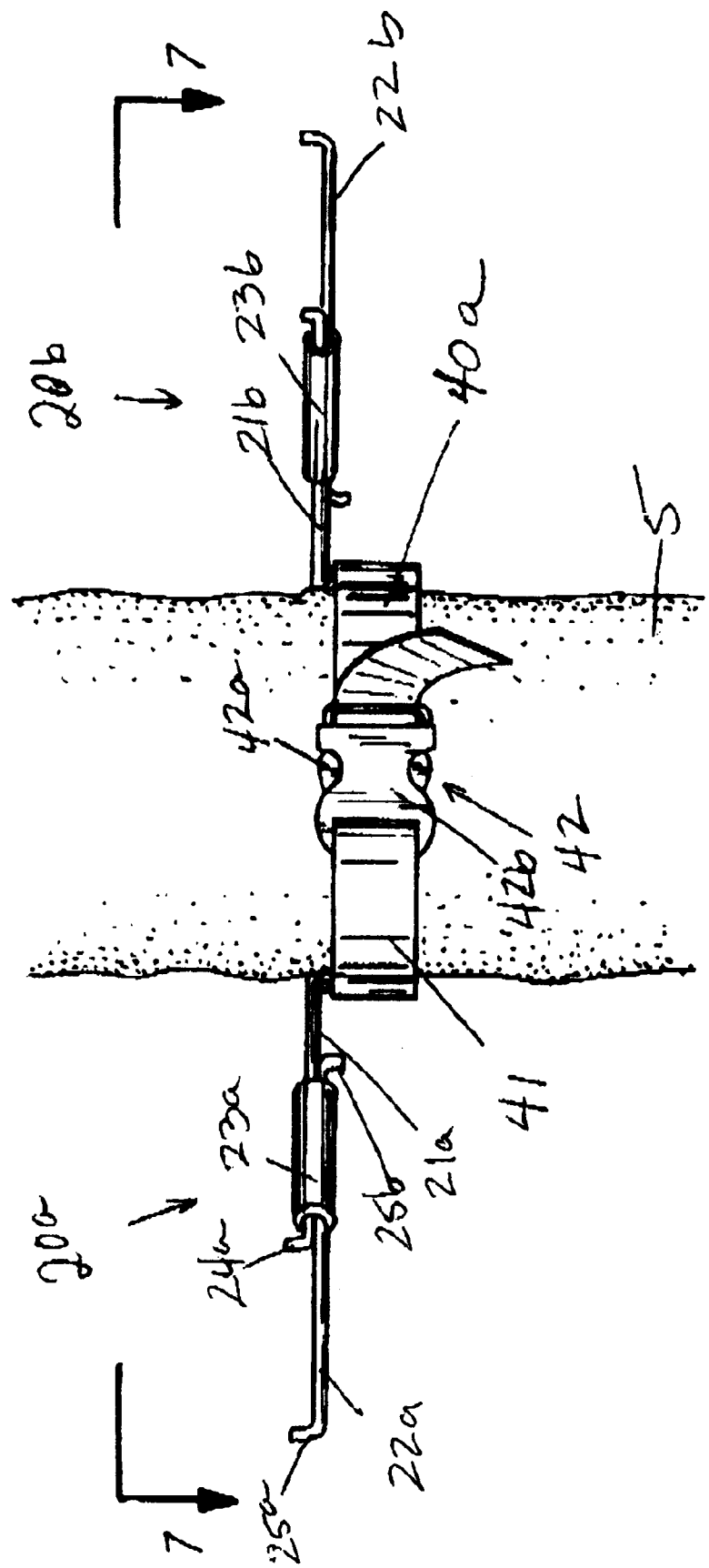
FIG. 6 illustrates a front view of the two telescopic horizontal support members coupled to the tree trunk at an angle without the camouflage panels.

Referring also to FIG. 6, first strap means 40a comprises a flexible strap mechanism 41 having an adjustable length wherein flexible strap mechanism 41 is circumferentially secured around tree trunk 5 via securing buckle means 42 wherein securing buckle means 42 comprises buckle means 42a and clasping mechanism 42b. The length of strap mechanism 41 may be adjusted in a myriad of conventional ways. However, in the exemplary embodiment, the length of strap mechanism 41 may be increased or decreased by moving buckle means 42a along the length of strap mechanism 41. When strap mechanism 41 is strapped around the circumference of tree trunk 5, strap mechanism 41 should be sufficiently tight around tree trunk 5 to prevent the weight of first and second telescopic horizontal members 20a and 20b and the weight of first and second camouflage panels 50a and 50b from sliding strap mechanism 41 downward.

First strap means 40a further comprises first and second harness members 43a and 43b wherein first and second harness members 43a and 43b support therein pivot rod members 30a and 30b, respectively, of first and second telescopic horizontal members 20a and 20b.

Since first and second harness members 43a and 43b are identical, only one such harness member will be described in detail. In the preferred embodiment, first harness member 43a comprises buckle-like member 44 slidably received on strap mechanism 41 wherein the slidable feature of buckle-like member 44 serves to allow the distance between first and second harness members 43a and 43b to be varied in accordance with the circumference of tree trunk 5. Buckle-like member 44 has a center member which serves to allow strap mechanism 41 to be slipped through buckle-like member and secured therein. The center member further has coupled thereto flexible conduit 45 having a hollow center wherein the axis of the hollow center is substantially aligned in the vertical plane. Flexible conduit 45 removably receives therein pivot rod member 30a. Anchoring means 31a of pivot rod member 30a is capable of being journalled through the hollow center of flexible conduit 45 until anchoring means 31a of pivot rod member 30a exits the other end of flexible conduit 45. Anchoring means 31a serves to prevent pivot rod member 30a from exiting flexible conduit 45 as counterbalancing reciprocating forces are applied to fixed horizontal member 21a.

Figure 1:
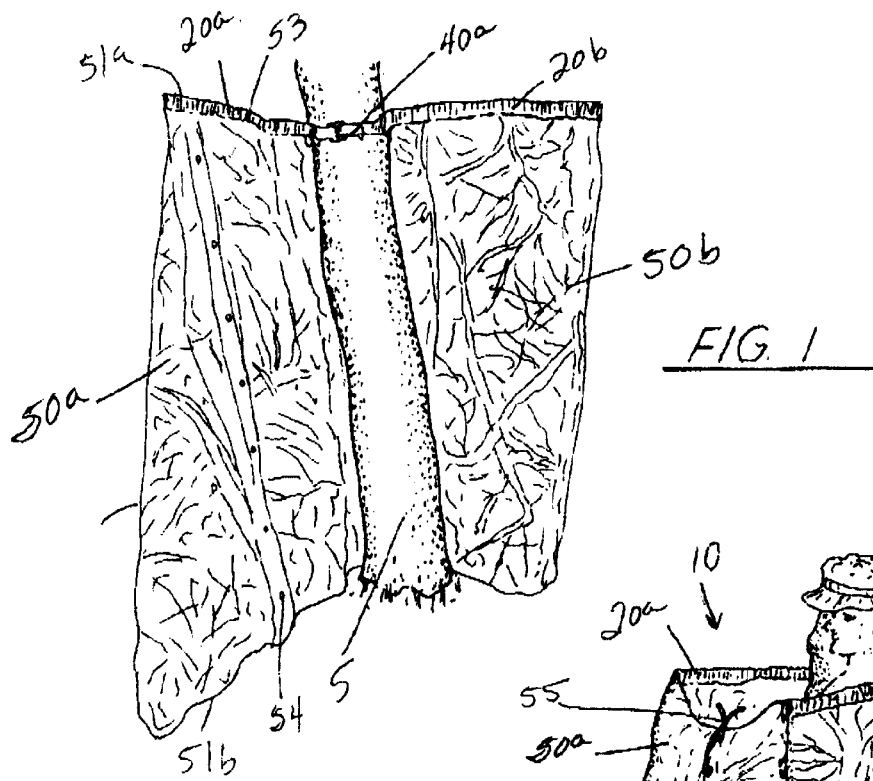
FIG. 1 illustrates a front view from the front of the tree trunk of the collapsible hunter's blind apparatus of the present invention.
Figure 3:
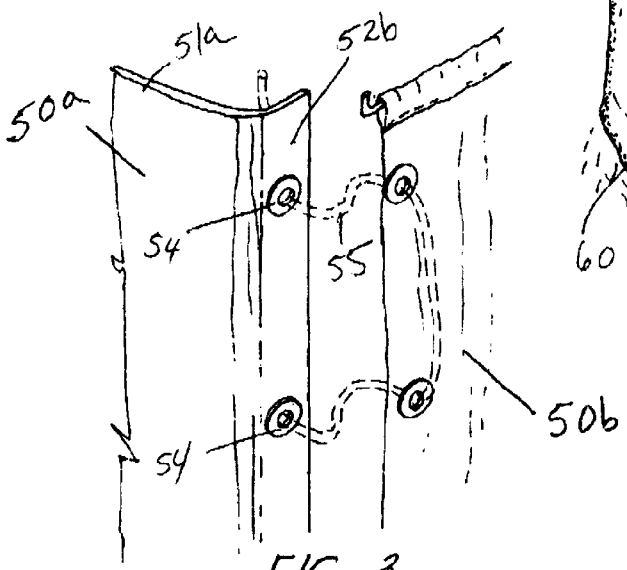
FIG. 3 illustrates a partial view of the camouflage panels showing the plurality of grommets and cord for closing the camouflage panels.
Figure 5:
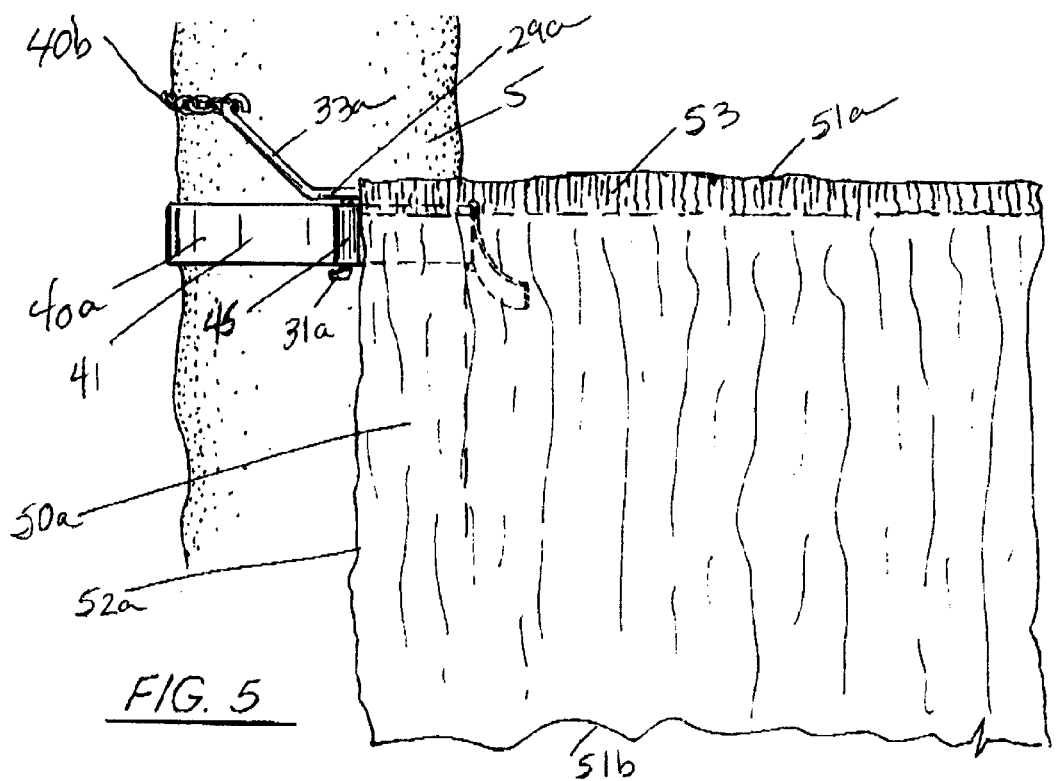
FIG. 5 illustrates a side perspective view of one of the two telescopic horizontal support members coupled to the tree trunk having one of the camouflage panels vertically draped therefrom.

Referring also to FIGS. 1, 3 and 5, first and second camouflage panels 50a and 50b are made of fabric such as, without limitation, canvas. First camouflage panel 50a is horizontally supported by the shaft defined by fixed horizontal member 21a and telescopic horizontal member 22a in its fully extended position of first telescopic horizontal support member 20a wherein first camouflage panel 50a vertically drapes downward to the ground therefrom. Likewise, second camouflage panel 50b is horizontally supported by fixed horizontal member 21b and telescopic horizontal member 22b in its fully extended position of second telescopic horizontal support member 20b wherein second camouflage panel 50b vertically drapes downward to the ground therefrom. Since first camouflage panel 50a and second camouflage panel 50b are identical, only one such camouflage panel will be described in detail.

First camouflage panel 50a has a length sufficiently longer than the length of the shaft defined by fixed horizontal member 21a and telescopic horizontal member 22a of first telescopic horizontal support member 20a even when telescopic horizontal member 22a is fully extended.

First camouflage panel 50a is defined by two horizontal sides 51a and 51b and two vertical sides 52a and 52b. Horizontal side 51a has hem 53 sewn therein for providing a conduit for sliding therein fixed horizontal member 21a and telescopic horizontal member 22a. The opening of the conduit formed by hem 53 allows fixed horizontal member 21a and telescopic horizontal member 22a to be journalled in the conduit.

The length of first camouflage panel 50a beyond the length of the shaft defined by the length of fixed horizontal member 21a and the length of telescopic horizontal member 22a in its fully extended position should be at least half the distance D between the radially flared ends of first and second telescopic horizontal support members 20a and 20b. Vertical side 52b of first camouflage panel 50a comprises a plurality of grommets 54 for receiving therein drawstring-like cord 55. Drawstring-like cord 55 serves to maintain first camouflage panel 50a and second camouflage panel 50b together to form wall 60 wherein wall 60 defines the base of the truncated triangularly-shaped enclosure 65, as best seen in FIG. 8.

Vertically draping first camouflage panel 50a horizontally supported by first telescopic horizontal support member 20a forms first leg 66a of truncated triangularly-shaped enclosure 65 wherein first leg 66a extends to the surface of tree trunk 5. Vertically draping second camouflage panel 50b horizontally supported by second telescopic horizontal support member 20b forms second leg 66b of truncated triangularly-shaped enclosure 65 wherein second leg 66b extends to the surface of tree trunk 5.

In operation, the length of first leg 66a and the length of second leg 66b are adjusted in relation to the extended length of telescopic horizontal members 22a and 22b, respectively, beyond fixed horizontal members 21a and 21b, respectively. The length of wall 60 may be increased by pivoting first and second telescopic horizontal support members 20a and 20b in opposite directions and shortening second strap means 40b. Additionally, the length of wall 60 may be decreased by pivoting first and second telescopic horizontal support members 20a and 20b toward each other and lengthening second strap means 40b.

Because many varying and differing embodiments may be made within the scope of the inventive concept herein taught and because many modifications may be made in the embodiment herein detailed in accordance with the descriptive requirement of the law, it is to be understood that the details herein are to be interpreted as illustrative and not in a limiting sense.

What is claimed as invention is:

1. A collapsible hunter's blind apparatus, for enclosing a hunter, comprising:
   (a) first and second vertically draping camouflage panels;
   (b) a first horizontal telescopic frame member for horizontally supporting said first vertically draping camouflage panel;
   (c) a second horizontal telescopic frame member for horizontally supporting said second vertically draping camouflage panel;
   (d) an adjustable strap member for coupling said first and second horizontal telescopic frame members in circumferential spaced relation around a tree trunk; and,
   (e) arc-shaped strap means which provides a reciprocating force to counterbalance gravitational forces and the weight of the horizontally supported first and second vertically draping camouflage panels acting on said first and second telescopic horizontal support members, respectively, to maintain each of said first and second telescopic horizontal support members substantially horizontal.

2. The apparatus of claim 1, wherein said first telescopic horizontal support member and said second telescopic horizontal support member each comprises:
   a fixed horizontal member;
   a telescopic horizontal member parallelly aligned with fixed horizontal member having a collapsed position and a fully extended position;
   a telescopic support conduit for supporting therein in said fixed horizontal member and said telescopic horizontal member wherein said telescopic horizontal member freely slides said within telescopic support conduit to said fully extended position; and,
   a securing structure.

3. The apparatus of claim 2, wherein said fixed horizontal member and said telescopic horizontal member when in said fully extended position of said first telescopic horizontal support member defines a first shaft and said fixed horizontal member and said telescopic horizontal member when in said fully extended position of said second telescopic horizontal support member defines a second shaft; and wherein said first and second camouflage panels each has a length wherein said length extends beyond the length of said first and second shafts, respectively, and at least half the distance between the radially flared ends of said first and second telescopic horizontal support members; and, a vertical side of said first and second camouflage panels comprises a plurality of grommets for receiving therein a drawstring-like cord wherein said drawstring-like cord serves to maintain said first camouflage panel and said second camouflage panel together to form a wall wherein said wall defines a base of a truncated triangularly-shaped enclosure and said first camouflage panel and said second camouflage panel along said first and second shafts, respectively, define a first leg and a second leg, respectively, of said truncated triangularly-shaped enclosure.

4. The apparatus of claim 2, wherein said securing structure comprises:
   a first angled member sloped in a horizontal plane and having one end coupled to one end of said fixed horizontal member to form an obtuse angle therewith;
   a short horizontal member having one end coupled to the other end of said first angled member wherein said short horizontal member is parallelly aligned with said fixed horizontal member;
   a pivot rod member perpendicularly coupled to said short horizontal member and removably coupled to said adjustable strap member; and,
   a second angled member sloped upward in a vertical direction wherein said second angled member provides a lifting means for transferring said counterbalancing force from said arc-shaped strap means, to said fixed horizontal member for maintaining said fixed horizontal member essentially parallel to the horizontal plane regardless of the gravitational forces acting thereon and the weight of said first and second camouflage panels suspended therefrom.

5. The apparatus of claim 1, wherein said arc-shaped strap means is a chain-link strap.

6. The apparatus of claim 1, wherein said adjustable strap means comprises a flexible strap mechanism having an adjustable length wherein said flexible strap mechanism is circumferentially securable around said tree trunk via a securing buckle.

7. The apparatus of claim 6, wherein said adjustable strap means comprises:
   a first slidable harness means, coupled at a first location on said adjustable strap member, for receiving therein a removably coupled pivot rod member of said first telescopic horizontal support member for pivotally securing said first telescopic horizontal support member circumferentially about said tree trunk; and,
   a second slidable harness means, coupled at a second location on said adjustable strap member, for receiving therein a removably coupled pivot rod member of said second telescopic horizontal support member for pivotally securing said second telescopic horizontal support member circumferentially about said tree trunk.

8. A collapsible hunter's blind apparatus, for enclosing a hunter, comprising:
   (a) first and second vertically draping camouflage panels;
   (b) a first horizontal telescopic frame member for horizontally supporting said first vertically draping camouflage panel;
   (c) a second horizontal telescopic frame member for horizontally supporting said second vertically draping camouflage panel;
   (d) an adjustable strap member for coupling said first and second horizontal telescopic frame members in circumferential spaced relation around a tree trunk; and,
   (e) arc-shaped strap means which provides a reciprocating force to counterbalance gravitational forces and the weight of the horizontally supported first and second vertically draping camouflage panels acting on said first and second telescopic horizontal support members, respectively, to maintain each of said first and second telescopic horizontal support members substantially horizontal; and 2) adjust the angle between said first and second telescopic horizontal support members which radially flare, pivotally, from said tree trunk to form an adjustable truncated triangularly-shaped enclosure.

9. The apparatus of claim 8, wherein said first telescopic horizontal support member and said second telescopic horizontal support member each comprises:
   a fixed horizontal member;
   a telescopic horizontal member parallelly aligned with fixed horizontal member having a collapsed position and a fully extended position;

a telescopic support conduit for supporting therein in said fixed horizontal member and said telescopic horizontal member wherein said telescopic horizontal member freely slides said within telescopic support conduit to said fully extended position; and, a securing structure.

10. The apparatus of claim 9, wherein said fixed horizontal member and said telescopic horizontal member when in said fully extended position of said first telescopic horizontal support member defines a first shaft and said fixed horizontal member and said telescopic horizontal member when in said fully extended position of said second telescopic horizontal support member defines a second shaft; and wherein said first and second camouflage panels each has a length wherein said length extends beyond the length of said first and second shafts, respectively, and at least half the distance between the radially flared ends of said first and second telescopic horizontal support members; and, a vertical side of said first and second camouflage panels comprises a plurality of grommets for receiving therein a drawstring-like cord wherein said drawstring-like cord serves to maintain said first camouflage panel and said second camouflage panel together to form a wall wherein said wall defines a base of the truncated triangularly-shaped enclosure and said first camouflage panel and said second camouflage panel along said first and second shafts, respectively, define a first leg and a second leg, respectively, of said truncated triangularly-shaped enclosure.

11. The apparatus of claim 9, wherein said securing structure comprises:

a first angled member sloped in a horizontal plane and having one end coupled to one end of said fixed horizontal member to form an obtuse angle therewith;

a short horizontal member having one end coupled to the other end of said first angled member wherein said short horizontal member is parallelly aligned with said fixed horizontal member;

a pivot rod member perpendicularly coupled to said short horizontal member and removably coupled to said adjustable strap member; and, a second angled member sloped upward in a vertical direction wherein said second angled member provides a lifting means for transferring said counterbalancing force from said arc-shaped strap means to said fixed horizontal member for maintaining said fixed horizontal member essentially parallel to the horizontal plane regardless of the gravitational forces acting thereon and the weight of said first and second camouflage panels suspended therefrom.

12. The apparatus of claim 8, wherein said arc-shaped strap means is a chain-link strap.

13. The apparatus of claim 8, wherein said adjustable strap means comprises a flexible strap mechanism having an adjustable length wherein said flexible strap mechanism is circumferentially securable around said tree trunk via a securing buckle.

14. The apparatus of claim 13, wherein said adjustable strap means comprises:

a first slidable harness means, coupled at a first location on said adjustable strap member, for receiving therein a removably coupled pivot rod member of said first telescopic horizontal support member for pivotally securing said first telescopic horizontal support member circumferentially about said tree trunk; and, a second slidable harness means, coupled at a second location on said adjustable strap member, for receiving therein a removably coupled pivot rod member of said second telescopic horizontal support member for pivotally securing said second telescopic horizontal support member circumferentially about said tree trunk.

15. A collapsible hunter's blind apparatus, for enclosing a hunter, comprising:

(a) first and second vertically draping camouflage panels;

(b) a first horizontal telescopic frame member having a first shaft for horizontally supporting said first vertically draping camouflage panel;

(c) a second horizontal telescopic frame member having a second shaft for horizontally supporting said second vertically draping camouflage panel wherein said first and second camouflage panels each has a length wherein said length extends beyond the length of said first and second shafts, respectively, and at least half the distance between radially flared ends of said first and second telescopic horizontal support members; and, a vertical side of said first and second camouflage panels comprises a plurality of grommets for receiving therein a drawstring-like cord wherein said drawstring-like cord serves to maintain said first camouflage panel and said second camouflage panel together to form a wall wherein said wall defines a base of a truncated triangularly-shaped enclosure and said first camouflage panel and said second camouflage panel along said first and second shafts, respectively, define a first leg and a second leg, respectively, of said truncated triangularly-shaped enclosure;

(d) an adjustable strap member for coupling said first and second horizontal telescopic frame members in circumferential spaced relation around a tree trunk; and, (e) arc-shaped strap means which serves to 1) provide a reciprocating force to counterbalance gravitational forces and the weight of the horizontally supported first and second vertically draping camouflage panels acting on said first and second telescopic horizontal support members, respectively, to maintain each of said first and second telescopic horizontal support members substantially horizontal; and 2) adjust the angle between said first and second telescopic horizontal support members which radially flare, pivotally, from said tree trunk to adjust said truncated triangularly-shaped enclosure.

16. The apparatus of claim 15, wherein said first shaft and said second shaft each comprises:

a fixed horizontal member;

a telescopic horizontal member parallelly aligned with fixed horizontal member having a collapsed position and a fully extended position; and, a telescopic support conduit for supporting therein in said fixed horizontal member and said telescopic horizontal member wherein said telescopic horizontal member freely slides said within telescopic support conduit to said fully extended position.

17. The apparatus of claim 16, wherein said first and second telescopic horizontal support members each further comprises a securing structure wherein said securing structure comprises:

a first angled member sloped in a horizontal plane and having one end coupled to one end of said fixed horizontal member to form an obtuse angle therewith;

a short horizontal member having one end coupled to the other end of said first angled member wherein said short horizontal member is parallelly aligned with said fixed horizontal member;

a pivot rod member perpendicularly coupled to said short horizontal member and removably coupled to said adjustable strap member; and a second angled member sloped upward in a vertical direction wherein said second angled member provides a lifting means for transferring said counterbalancing force from said arc-shaped strap means to said fixed horizontal member for maintaining said fixed horizontal member essentially parallel to the horizontal plane regardless of the gravitational forces acting thereon and the weight of said first and second camouflage panels suspended therefrom.

18. The apparatus of claim 15, wherein said arc-shaped strap means is a chain-link strap.

19. The apparatus of claim 15, wherein said adjustable strap means comprises a flexible strap mechanism having an adjustable length wherein said flexible strap mechanism is circumferentially securable around said tree trunk via a securing buckle.

20. The apparatus of claim 19, wherein said adjustable strap means comprises:

a first slidable harness means, coupled at a first location on said adjustable strap member, for receiving therein a removably coupled pivot rod member of said first telescopic horizontal support member for pivotally securing said first telescopic horizontal support member circumferentially about said tree trunk; and, a second slidable harness means, coupled at a second location on said adjustable strap member, for receiving therein a removably coupled pivot rod member of said second telescopic horizontal support member for pivotally securing said second telescopic horizontal support member circumferentially about said tree trunk.

* * * * *